United States Patent [19]
McGregor et al.

[11] Patent Number: 5,577,100
[45] Date of Patent: Nov. 19, 1996

[54] MOBILE PHONE WITH INTERNAL ACCOUNTING

[75] Inventors: Donald S. McGregor; Gregory M. McGregor, both of Danville, Calif.

[73] Assignee: Telemac Cellular Corporation, Danville, Calif.

[21] Appl. No.: 381,704

[22] Filed: Jan. 30, 1995

[51] Int. Cl.$^6$ .............................. H04Q 7/32; H04Q 7/34
[52] U.S. Cl. .............................. 379/58; 379/59; 455/33.1
[58] Field of Search .............................. 379/58, 59, 61, 379/62, 63

[56] References Cited

U.S. PATENT DOCUMENTS

| | | | |
|---|---|---|---|
| 3,459,882 | 8/1969 | Gabriel et al. | 178/5.1 |
| 3,531,586 | 9/1970 | Bass et al. | 178/6 |
| 4,518,824 | 5/1985 | Mondardini | 179/6.3 |
| 4,706,275 | 11/1987 | Kamil | 379/144 |
| 4,839,829 | 6/1989 | Freedman | 364/519 |
| 4,860,341 | 8/1989 | D'Avello et al. | 379/91 |
| 4,951,308 | 8/1990 | Bishop et al. | 379/91 |
| 4,958,368 | 9/1990 | Parker | 379/91 |
| 4,965,821 | 10/1990 | Bishop et al. | 379/58 |
| 5,046,188 | 9/1991 | Molnar | 379/94 |
| 5,109,401 | 4/1992 | Hattori et al. | 379/58 |
| 5,127,041 | 6/1992 | O'Sullivan | 379/59 |
| 5,138,650 | 8/1992 | Stahl et al. | 379/61 |
| 5,144,649 | 9/1992 | Zicker et al. | 379/59 |
| 5,148,474 | 9/1992 | Haralambopoulos et al. | 379/111 |
| 5,297,191 | 3/1994 | Gersztberg | 379/59 |
| 5,297,192 | 3/1994 | Gersztberg | 379/59 |
| 5,301,223 | 4/1994 | Amadon et al. | 379/58 |
| 5,303,297 | 4/1994 | Hillis | 379/63 |
| 5,325,418 | 6/1994 | McGregor et al. | 379/59 |
| 5,335,278 | 8/1994 | Matchett et al. | 380/23 |
| 5,359,182 | 10/1994 | Schilling | 235/380 |
| 5,386,455 | 1/1995 | Cooper | 379/58 |

OTHER PUBLICATIONS

Nokia Service Manual, 101/1000, Nokia Mobile Phones, Inc., copyright 1991 and 1992, chapter 5.

*Primary Examiner*—Curtis Kuntz
*Assistant Examiner*—Nay Aung Maung
*Attorney, Agent, or Firm*—Bielen, Peterson & Lampe

[57] ABSTRACT

A mobile phone system with a mobile phone having internal accounting capabilities for real time call debiting to account for the billing parameters of a mobile phone unit that is operated in a multi zone communication network with a complex rate structure, the mobile phone unit having an internal processor with accessible internal memory for storing the accounting program and call data for each call, a clock and circuit means for activating and deactivating the phone, the accounting program including an updatable rate table and a complex billing algorithm for calculating the account status on the fly including multiple rate structure factors such as long distance calls, international calls with country independent local charges, charges for roaming per day and/or roaming per minute, and call surcharges, where the account status of the mobile phone is calculated in real time for decrementing a debit account or calculating an account charge on demand, the mobile debit phone having a signal for alerting the user of account status which is preferably a display of real time account status, the mobile phone system including a communication system for activating and programming a new phone unit over the airways and upgrading the account status in rate table in the phone unit over the airways.

33 Claims, 1 Drawing Sheet

MOBILE PHONE WITH INTERNAL ACCOUNTING

BACKGROUND OF THE INVENTION

This invention relates to a mobile phone system with a mobile telephone accounting protocol for mobile phones, and in particular to cellular phones and radio phones that are capable of moving from one transmission station to another in a communication network. In particular, the mobile telephone accounting protocol is adapted for a mobile debit phone in which the communication traffic with the service provider is minimized to expand traffic handling capacity of the service provider by accomplishing the accounting procedures within each mobile phone unit. The mobile telephone accounting protocol is similar to that described in U.S. Pat. No. 5,325,418, which is incorporated herein by reference. In the referenced patent, an accounting system is described which has particular application to a rental phone system or a controlled phone system, such as an intra-corporate system where periodic calculation of phone charges are made prior to receipt of billings from public or switched service providers. In such systems, phone call data is stored in the mobile phone unit and charges are calculated by a host processor after a dialogue is established between the host processor and the phone unit. This system requires that a communication link be established between the host processor and the mobile phone unit and may require that the phone unit be physically connected to the host processor.

Although debit systems with internal debit and credit memory for cordless phones have been previously proposed such systems do not account for the particular complexities of mobile phone systems wherein multiple service providers may be involved in a communication network and the mobile phone is allowed to move or roam across defined zones or cells within a particular service area or across multiple service area. In such situations, the location of the mobile phone making the call is as important for billing calculations as the location of the phone or stations being called. This added complexity complicates billing procedures for mobile phones and increases the communication session required for remote debit systems, thereby adding to airway traffic.

In addition to the objective of eliminating an accounting session with a service provider for each call made, the mobile phone with internal accounting capabilities greatly expands the potential customer base by enabling persons with inadequate credit to obtain mobile phone service by the use of a pay-as-you-go debit account. In this case, the credit risk is avoided by prepayment of service and call charges, and where credit is extended permits the credit to be provided by an entity other than the service provider, for example by the seller of the phone, or by a billing service that provides credit or pre-paid accounts for mobile phone users.

The mobile phone unit of this invention can be used with a mobile phone rental system as described in reference U.S. Pat. No. 5,325,418. Because the mobile phone unit itself includes the accounting capabilities, the rental system can be greatly expanded, allowing the return station to have minimum system hardware, and indeed, requiring only the ordinary equipment necessary to clear an account, collect the charges and store the returned phone for pick-up or return to an initiating station. The mobile phone unit itself calculates the charges on the fly and provides a cumulative account record for review at the return station. The mobile phone system of this invention is adapted for analog or digital cellular telephones, radiophones in personal communication service networks (PCS's) and other wireless communication systems where it is desirable that call accounting be done on the fly.

SUMMARY OF THE INVENTION

The mobile phone system with mobile phones having internal accounting of this invention relates to wireless communication systems having mobile communication devices, particularly mobile telephones that are part of a wireless communication network. In particular, the invention relates to a mobile communication device, such as a mobile telephone unit that includes an internal accounting protocol for internal calculation of communication charges on the fly. Such mobile telephone units or mobile phone units are typically cellular telephones in a cellular phone network, radio telephones in a personal communication service network or other communication system where the communication device is moveable from place to place and requires a complex accounting system for calculating calling charges in real time or on the fly.

Although the primary intended use of the mobile phone system of this invention is intended for mobile debit phone units, where real time calculation of phone charges is necessary to limit phone use or to immediately bill for phone use where the billings of public switched service providers and involved wireless service providers are not yet available.

A real time accounting system carried internally in the mobile phone unit greatly expands the potential customer base for such units and coupled with certain activation and deactivation features allows a new segment of business to become involved in the mobile communications industry. Because credit responsibility can be shifted from the service provider, retailers, billing services, and a host of intermediate entities can be integrated between the phone user and the service provider. Additionally, the service provider can expand its customer base by providing mobile debit phones to its customers with a pre-paid phone credit or with a preapproved credit limit that will deactivate the phone unit if credit is exceeded or credit is not extended by the airway activation and credit transfer procedures that form a part of this mobile phone system. In this manner, the credit risk is limited to an acceptable predefined level.

The accounting system that provides these features is carried internally in the mobile communication device, for convenience, hereafter called the mobile phone unit. The accounting system includes a complex billing algorithm with a multiple factor accounting protocol to account for local charges, roaming charges when the mobile phone unit moves from one zone to another, long distance charges, international charges including country independent local charges, and surcharges which may be per call or rate based. The complex billing algorithm can be expanded to accommodate special charges of service providers or called stations or special discounts or premiums for data transfer calls.

The complex algorithm is stored within the phone unit, together with a rate schedule. The rate schedule may be periodically updated by a wireless communication with a host or service provider.

It is to be understood that the mobile phone unit with internal accounting can be implemented into existing wireless communication networks without substantial modification to the network and can be implemented into most existing mobile communication devices with minimal modification, primarily by internal reprogramming of the device.

A mobile phone unit such as a cellular telephone currently includes an internal processor and sufficient internal memory to incorporate the programming and data storage necessary to accomplish the real time accounting. The complex algorithm providing the multiple factor accounting protocol is sufficiently compact that storage and processing of the call data is enabled in real time with sufficient accuracy to account for multiple charges from multiple service providers even for a roaming phone unit. The accounting protocol enables internal tracking of phone usage with activation and deactivation of the phone unit to insure unauthorized usage is prevented. The accounting protocol further includes an encryption system to permit activation and licensed use of the phone unit, and account credit transfers on the fly over the airways.

These and other features of the mobile phone system with internal accounting in the mobile phone units will become apparent upon consideration of the Detailed Description of the Preferred Embodiments that follows.

DETAILED DESCRIPTION OF THE PREFERRED EMBODIMENTS

Figure 1:
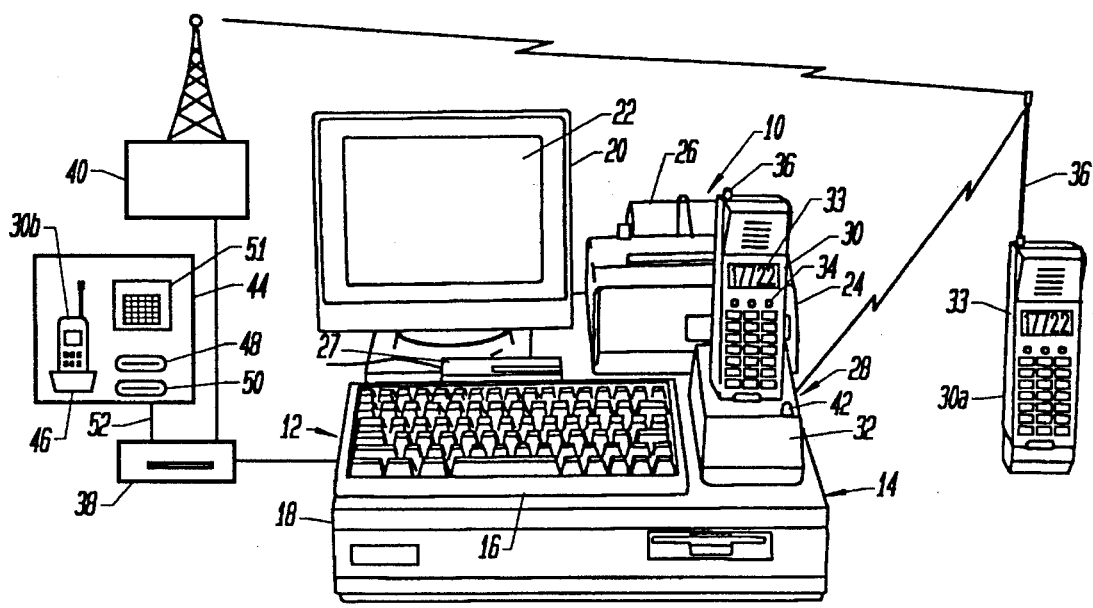
FIG. 1 is a perspective view of the components of the mobile phone accounting system of this invention with part of the system shown schematically.

Referring to FIG. 1, the mobile phone accounting system of this invention is designated generally by the reference numeral 10, and illustrates a stand-alone, tracking and accounting unit 12 that may be used by a rental agency or by a mobile phone dispensing center such as a retail store, or a center associated with a wireless service provider.

The tracking and accounting unit 12 includes a central processing unit 14 that combines a data entry keyboard 16 coupled to a controller or data processor 18, which in turn is coupled to a monitor 20 having a display screen 22 for tracking data entry and review. Also connected to the processor 18 are peripheral components including a printer 24, here with a continuous paper roll 26 for printing statements, receipts, customer and service provider contracts, and the like, and a credit card reader 27 for credit verification.

Included in one embodiment of the tracking unit 18 of the mobile phone accounting system is direct couple, interlink receiver 28, shown with an installed hand-held, mobile phone unit 30. The interlink receiver 28 structurally forms a boot 32 into which the cellular phone unit 30 is inserted for direct, electronic coupling of the phone unit 30 and the data processor 18 of the central processing unit 14. As many of the accounting functions of the accounting system are preferred internally in the phone unit 30, satellite processors for activating and programming phone units require only a personal computer with a modem and a bus connect to the connection port of the phone unit.

In the arrangement of FIG. 1, the interlink receiver 60 functions as a terminal interconnect allowing for direct "hard wire" communication between the data processor 18 and the mobile phone unit 30 through the connection port of the phone unit 30. Programming and activation of the phone unit 30 can be accomplished by the processing unit 14 through the interlink receiver with minimal security procedures. The processing unit 14 is particularly useful in opening new customer accounts and includes the necessary data base format for assigning a phone to a user and tracking the assigned phone as described in detail in co-pending application, entitled, "MOBILE PHONE DISTRIBUTION SYSTEM," Ser. No. 08/265,373, filed 23 Jun. 1994.

Figure 2:
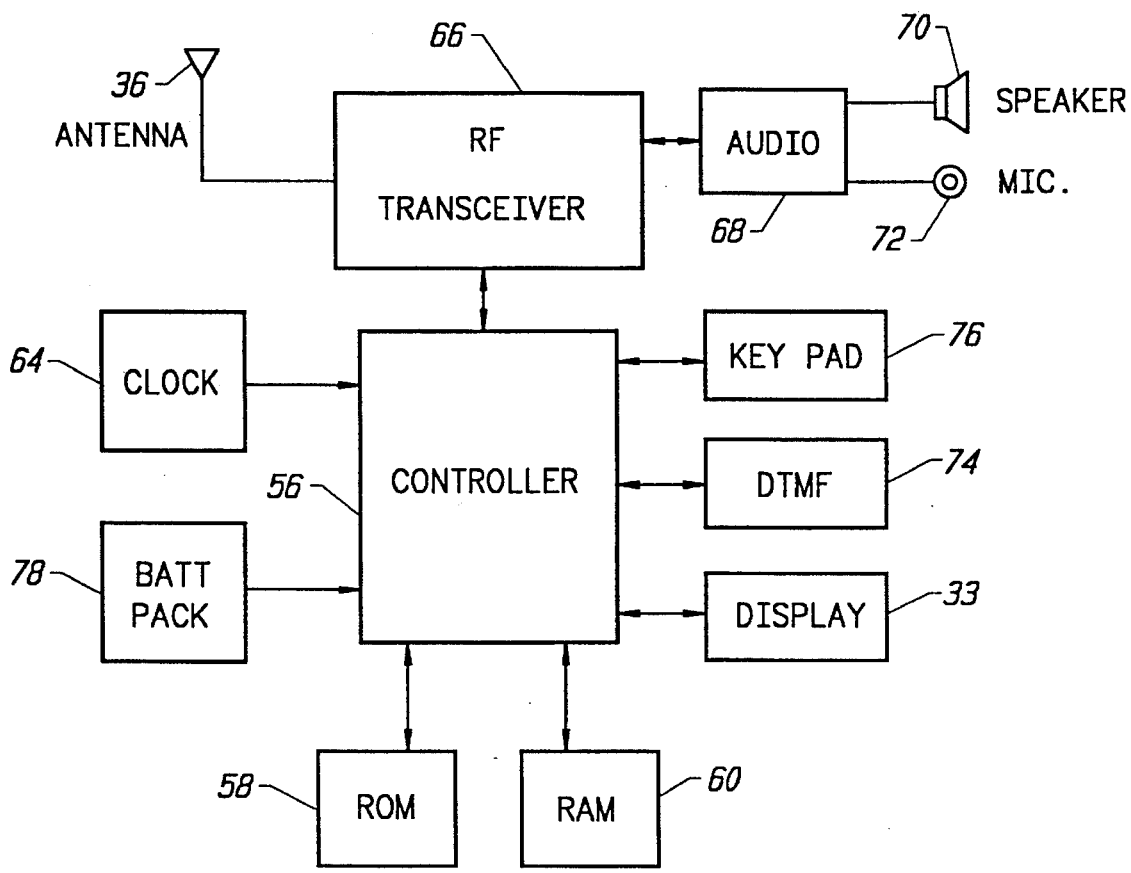
FIG. 2 is a schematic view of the basic internal components of a mobile phone unit.

The mobile phone unit 30 is preferably a contemporary unit with an LCD display screen 32 for display of phone numbers, account data, and other numeric or alphanumeric data. Additionally, the phone unit 30 includes one or more light emitting diodes 34, to signal a user with color coded lights during a call that an impending deactivation of the phone unit 30 is near. The phone unit 30 includes conventional circuitry and firmware to perform the customary communication, transmission and reception function, as shown in FIG. 2. The phone unit 30 has a transceiver antenna 36 for wireless communication, and as described hereafter, can be activated and programmed over the airways.

In the embodiment of FIG. 1, the central processing unit 14 includes a modem 38 that is linked to a transmission station 40 for establishing a wireless communication link to a phone unit 30a, shown with its antenna extended for reception. The transmission station 40 may be part of the mobile phone system common to the central processing unit 14 and owned by the system provider, or may be owned by an external service provider and part of the external communications network that includes the public switching network.

In this mode of operation, the central processing unit 14 communicates via hardwire, possibly through a public service network to the RF transmission station 40 for remote processing between the central processing unit 14 and the mobile phone unit 30a. Alternately, a low level transceiver 42, preferably with control circuitry located within the interlink receiver 28, provides for RF communication with the phone unit 30a within local range. This feature is useful in retail centers where it is desired that the central processing unit 14 be located in a computer room and sales clerks communicating with a customer, communicate to the central processing unit through one or more floor terminals with limited processing capabilities for security reasons.

Since the mobile phone unit 30 includes the necessary accounting functions to internally maintain a user's call account, at least within a a rental period or within period of periodic polling by the central processing unit 14 during off hours, the unit 30 and a transaction station 44 need only verify the validity of a money transfer or credit transfer. When functioning as a debit phone, the phone can continue to operate until the account is exhausted, without contact with the system provider. The transaction station 44 shown in FIG. 1 includes an interlink receiver boot 46 in which is installed a mobile phone unit 30b. The transaction station 44 includes a cash receiving slot 48 for receiving cash for increasing the internal pre-paid account of the phone. The transaction station 44 also includes a card slot 50 for receiving pre-paid phone cards or credit cards and a key pad 51 for data entry. Verification of the value of phone cards and credit card may be accomplished by a stand alone transaction station 44, however, to prevent fraud it is preferred that a transaction station 44 having a card reader be connected by a communication line 52, as shown, to credit verification center, here the central processing unit 14 via the modem 38. The phone card is a discardable credit card-like device having a magnetic strip coded with a pre-paid amount and can be sold independently of the phone system. To prevent reuse of dispensed cards by reprogramming the magnetic strip, the card is voided upon use, and the card serial number is centrally logged as void.

Similarly, to provide an opportunity for a credit card verification, the use of a direct communication line 52 to the modem 38 or alternately to a local credit agency is preferred. The transaction station 44 also incudes a key pad 54 allowing a user to select the amount to be added to the internal account in the phone. In this manner, where the mobile phone user desires to increase his phone use account amount without a dialogue with the system provider, there is an opportunity to do so. The call data in the phone unit is dumped to the transaction station or cleared to permit the accumulation of new data related to the upgrade account. Alternately, where an account has been established with the system provider, which may be an entity different from the wireless service provider with whom the system may contract, the mobile phone user may request an increase in the internal debit account by contacting the system provider through the airways as shown by the phone unit 30a in FIG. 1.

Referring to FIG. 2, a generalized electronic schematic is shown of the typical mobile phone unit 30 used in the system here described. The phone unit 30 includes a processor 56 that acts as a controller to coordinate the functions of the unit 30. The processor 56 has an associated memory comprising an EPROM chip 58 which stores the firmware that forms the core operating code of the unit and one or more RAM chips 60, that provide programmable memory and may include command codes as well as data storage, for example for logging the call data. Also, closely associated with the controller is a clock chip 64, which provides a timer for calls. In the preferred mobile phone unit 30, the clock chip is a real time chip that provides time and date for improved call logging and for greater flexibility in phone use plans. Use of a real time clock chip is not required for the described mobile phone accounting system, but allows for full use of the logging and tracking features. Additionally, certain features such as deactivation of the phone of a set date is accomplished using a real time clock chip. Call counters and cumulative time limits for deactivation may be served by a timer chip.

Airway communication is provided through the antenna 36, which is connected to an RF transceiver connected to the processor 56 and to an analog audio circuit 68 with an ear phone output 70 and a microphone input 72. The audio circuit 68 is also connected to the processor 56 for audio output of touch-tones, warning signals and the like. The phone unit 30 includes DTMF decoder chip 72 and a keypad 76 for data entry, such as telephone numbers, and DTMF signals for code dialogues with the central processor over the airways. Preferably, the phone unit 30 includes a LCD display screen 33 as noted and a series of green, yellow and red LEDs 34 to visibly warn of a forced termination of a call because of loss of credit of the like, with yellow providing a five minute warning light, for example. Audio warnings are transmitted through the earphone 74. The phone unit 30 is powered by a battery pack 78.

Ordinarily, by displacing certain features in a manufacturer's stock phone unit, such as the storage of frequently called numbers in a cellular phone, the RAM is sufficiently large to accept the complex billing algorithm and the command set necessary to convert a cellular phone to a real time billing phone. Where the existing RAM is inadequate, modification by installation of additional RAM or ROM will allow incorporation of the conversion code and data. For example, in a newly designed phone, the new auxiliary firmware in including parts of the complex billing algorithm and much of the command set, could advantageously be allocated to ROM, with changeable data such as the rate tables and call log allocated to RAM. Alternately, all wireless auxiliary firmware and changeable data can be allocated to existing RAM or added RAM.

The phone unit 30 when received from the manufacture includes a fixed ESN (electronic serial number) unique to each phone. To be functional, the phone unit is programmed and this may be accomplished individually, as described in U.S. Pat. No. 5,325,418 or in batch mode as described in the referenced application. The existing ESN and GIM (group identification mark) are read and stored and the NAM (number assigned module) is run, assigning the MIN (mobile identification number), SID (site identification number) and other parameters to activate a phone unit for general use. The MIN is the assigned telephone number for the unit and should be one of the last numbers assigned, if step programming is accomplished to preserve a working inventory of available MINs. Step programming may be desired where a batch of phones are programmed and assigned to a service provider identified by SID, which then assigns a phone to a customer at the service provider's location.

Customarily, the phones are programmed by installing the phone unit in an interlink receiver 28 in the central processor unit 14 or at a remote terminal connected to the central processor unit. The phone unit 30 can alternately be activated and programmed on the fly by use of the paging capabilities of the phone unit via the DTMF signals as described hereafter. This feature allows remote programming of the phone over the airways via the transmission station without the necessity of the direct connection of the phone port connector to the central processor unit 14.

In the mobile phone system of this invention where the mobile phone unit has internal accounting capabilities, the phone unit is programmed with the code responsive to the command set, the complex billing algorithm, the license code and other parameters allowing the phone unit to be a periodically polled unit, for example, in a rental environment, or a debit unit, where account status can be determined and upgraded on the fly. The following table, Table I, lists the command set. The command set is suitable for most modern cellular type phones and it is understood that modifications may be required for phone units of different types or different manufacturers. As noted, certain commands may not be operational where the hardware includes a clock chip that does to provide real time and date, and suitable modification is required.

TABLE I

|  | DESCRIPTION |
|---|---|
| BASE COMMANDS | |
| RD_PHONE_NUMBER | Read the telephone's phone number |
| RD_PHONE_CALLS | Read the telephone's call data activity storage |
| RD_PHONE_TIME | Read the current time from the phone |
| WR_PHONE_TIME | Set the current time of the phone |
| RD_PHONE_RTB | Read the phone's software revision number |
| LOCK_PHONE | Lock the phone from use |
| UNLOCK_PHONE | Unlock phone for use |
| RD_CALL_COUNTER | Read the number of calls made during the period |
| RD_COMMAND_STATUS | Read status of last command issued |
| RESET_CALLS_MEMORY | Reset/erase the call activity storage data |

TABLE I-continued

| | DESCRIPTION |
|---|---|
| RESET_CALLS_COUNTER | Reset the call counter to 0 |
| RESTRICT_ILLEGAL_CALLS | Restrict all illegal calls |
| ENABLE_ALL_CALLS | Deactivate the call restriction |
| RD_TELEPHONE_ESN | Read the phone's electronic serial number |
| WR_NAM | Write NAM parameters to the phone |
| RD_NAM | Read the current NAM parameters from the phone |
| WR_SCRATCH_PAD | Store a small amount of data in the phone |
| RD_SCRATCH_PAD | Read the small amount of data from the phone |
| WR_LOCK_DATE | The date at which the phone will no longer function |
| RD_LOCK_DATE | Read the lock data from the phone |
| REGISTRATION | System provider registers itself for use with the phone. (Password is transmitted) |
| DEBIT COMMANDS | |
| WR_CONF_DATA | Write debit configuration data to the phone |
| RD_CONF_DATA | Read the configuration data from the phone |
| WR_DOLLAR_AMOUNT | Write the maximum dollar amount the phone can be used |
| RD_DOLLAR_AMOUNT | Read the maximum dollar amount from the phone |
| DO_CALL_TRACKING | Turn on call tracking |
| NO_CALL_TRACKING | Turn off call tracking |
| DO_DEBIT_MODE | Turn on debit mode billing |
| NO_DEBIT_MODE | Turn off debit mode billing |
| ENABLE_AIR_ACTIVATION | Turn on over the air debit activation of funds |
| DISABLE_AIR_ACTIVATION | Turn off over the air debit activation of funds |
| OTHER RESPONSES | |
| ACK | Acknowledgement |
| NAK | Could not understand HOST/PP or Invalid LRC |
| OTHER INTERACTIVE COMMANDS USING THE PHONE KEY BOARD | |
| UPDATE_DEBIT_DATA1 | Update, over the air, the current additional dollar amount and date of expiration referencing the Telephone License Number |
| VIEW_CURRENT_AMOUNT | View the current dollar amount left for debit |
| UPDATE_DEBIT_DATA2 | If for some reasons the "over the air" updating of the debit data cannot be successfully completed, the user can be given a license number to manually type in using the keypad via this function |

A suggested protocol for the command set in Table I uses the acronyms in the following table:

TABLE II

| Acronyms | Description |
|---|---|
| HOST | A systems operator's Personal Computer will be considered the host |
| PP | The phone unit will be considered the Phone Peripheral |
| DB | A Data Byte |
| CB | A Command Byte |
| CTI | A Cellular Telephone Interference |
| ACK | An Acknowledgement from the phone unit |
| NAK | The PP or HOST did not understand the last set of data retrieved |
| BCD | Binary Coded Decimal |

The host computer comprises the central processing unit 14 of FIG. 1 or a satellite computer that is preferably connected to the central processing unit 14 which acts as a hub for system wide coordination of accounting and tracking information. The host computer, which may be a typical higher end PC communicates to the phone units via a bus using a standard Asynchroneous RS-232 serial port at 9600 band, no parity, 1 stop bit, 8 data bits or a customized interface tailored to a particular manufacturer's phone unit. Where programming the initial activation of a phone unit over the airway, the initial dialogue is accomplished using DTMF signals. A factory phone has limited calling capability, typically 911 for emergency. The factory phones are preprogrammed to allow an additional dedicated 800 number, the number of the system provider service center. Once the connect is made by voice dialogue, the phone is switched to page mode and the service operator initiates the STMF code program. The ESN is checked by the HOST and if verified as an authorized phone for assignment by the HOST, the NAM parameters are programmed to the phone unit (PP). The programming of the phone as an internal accounting phone is also accomplished using DTMF signals. Because of security reasons, it is preferred that the phone unit programmed through the bus by direct connection as previously described.

A suggested data format for the command set listed in Table I is set forth in the following paragraphs:

RD_PHONE_NUMBER

HOST and PP Interaction:

HOST sends CB to PP

PP sends DBS+LRC (Longitudinal Redundancy Check)

Data From Phone:

DBs is an ASCII string representation of the MIN. eg. 5108382400

LRC Calculation

The LRC, Longitudinal Redundance Check, is calculated by the following algorithm:

```
b = 0X00
LOOP I=0 to length of data
    b=b XOR data[I]
LRC = b
```

The LRC is used when any data bytes, DB, are sent to the PP or form the PP

RD_PHONE_CALLS

HOST an PP Interaction:

HOST sends RD CALLS COUNTER to PP

PP sends back DB for the call counter to HOST

HOST sends CB to PP

PP sends back all call data to HOST followed by an LRC byte (Longitudinal Redundancy Check) (The bytes coming back would be number of calls *17+1 for the LRC)

WR_PHONE_TIME
HOST and PP Interaction:
HOST sends CB+DB(4)+LRC to PP (The LRC would include the CB )
PP sends back an ACK to HOST
Data sent to phone:
The CB, RD_PHONE_TIME, is sent followed by 4 bytes containing the MMDDHHMM in BCD. The month, day, hour and minute are each in the form of a BCD byte
Example:
eg.. for Jan. 1, 1980 at 1 pm the DB would look like 01011300 where 01, 01, 13 and 00 are all bytes
RD_PHONE_TIME
HOST and PP Interaction:
HOST sends a CB to PP
PP sends back a DB(4)+LRC to HOST
Data sent form phone:
The data sent from the phone is identical to the data sent to the phone in WR_PHONE_TIME
Example:
eg.. For Feb. 2, 1999 at 2:12 pm the DB bytes would look like 02021412 etc.
RD_PHONE_RTB
HOST and PP Interaction:
HOST sends a CB to PP
PP sends back its firmware revision number in some format relevant to the phone+LRC
Data sent from phone:
TBD. Specific to the manufacturers phone
LOCK_PHONE
When the phone is in "locked" mode, the phone should display the word "LOCKED" on the main viewing screen. The phone is completely deactivated while in this mode until the HOST issues the UNLOCK_PHONE command. The purpose of this mode is to secure the phone in between rentals or debit-rentals. While in this mode, it prevents users, or employees, from stealing air time. Also, if the phone is stolen while in this mode, the phone is worthless. This worthlessness provides a sense of security for the supplier of the phones.
HOST and PP Interaction:
HOST sends a CB to PP
PP send back an ACK to HOST
UNLOCK_PHONE
This mode is just opposite the LOCK_PHONE or "LOCKED" mode. In this mode, the phone is completely usable.
HOST and PP Interaction:
HOST sends CB to PP
PP sends an ACK to HOST
RD_CALL_COUNTER
This comment allows the HOST to read the current number of calls that have been made on this phone during this rental. From there, the HOST can use this as data to present to the user and use this data to determine the number of bytes the phone will send when issued the RD_PHONE_CALLS command.
Host and PP Interaction:
HOST sends CB to PP
PP sends DB(2)+LRC to HOST
The two data bytes are 16 bits from most significant bit to least significant bit. These two bytes represent the number of calls that have been made on the telephone. The last, or third byte, is and LRC.
RD_COMMAND_STATUS
At any point during the PP interrogation by the HOST, the HOST can issue this command byte, CB, to determine the state of the last command sent. Even though ACK's and LRC's are used, this provides a general status check on the PP.

HOST and PP Interaction:
HOST sends CB to PP+LRC
PP sends back DB(2)+LRC to HOST
Data Sent From PP:
The DB byte sent from the phone can be used to diagnose internal problems that have occurred in the phone. If the last command and the current state of the phone is good, the DB should be 0×01. The rest of the bytes values can be left up to the manufacturer to decide what phone specific information can be returned via this byte.
RESET_CALLS_MEMORY
If the DO_CALL_TRACKING has been turned on during a rental period, the phone will have been storing call data in memory blocks of 17 bytes per call. This commence is used to either clear the memory or simply reset a pointer in memory to the call data.
HOST and PP Interaction:
HOST sends a CB to PP+LRC
PP sends an ACK to HOST
RESET_ILLEGAL_CALLS
The service provider has created a small algorithm that lets a phone perform call restriction. This feature allows the service provider to disable segments of the numbers or whole numbers right at the source; the phone.
HOST and PP Interaction:
HOST sends a CB+DB(63)+LRC to PP
PP sends an ACK to HOST
Data Sent From Host:

| | |
|---|---|
| KL = Key length, digit count to use for the search | 1 byte |
| KEY = The actual digits for the search | 7 bytes |
| ODS = Offset from the end of the digit string to search | 1 byte |
| Total: | 9 bytes |

The total number of numbers to block is 7 which gives us 7*9=63 bytes of configuration data.
ENABLE_ALL_CALLS
This command disables the call restriction feature. If this command has been issued to the phone, then step 2.0 and 2.1 are executed in the call restriction algorithm. On the other hand, if the RESTRICT_ILLEGAL_CALLS is issued to the phone with the configuration data, the phone would be placed in call restriction mode.
HOST and PP Interaction:
HOST sends CB to PP+LRC
PP sends ACK to HOST
RD_TELEPHONE_ESN
The HOST requests the ESN and the phone transmits the ESN to the HOST. The ESN is the only non changeable part in the NAM that phones can be tracked by.
HOST and PP Interaction:
HOST sends CB to PP
PP sends DB(x)+LRC to HOST
Data Sent to HOST:
The data that is sent to the HOST is dependent on the format the manufacturer is using.
WR_NAM
Writing the NAM via the HOST provides some benefits which are:
1. Miss-programming by employees which leads to bad service;
2. Fraud prevention in that the phone can only be programmed via this command; therefore, this deters an individual from simply stealing a rental phone and getting service somewhere else;
3. Safely and effectively moving hones from place to place; and 4. No training is required at the rental/debit site to activate the telephone.

The following are a general list of parameters that would need to be programmed in an analog cellular phone:

MIN, Mobile Identification Number
SID, System ID (A side is a while the B side is an even number)
GIM, Group Identification Mark/ID (Typically 0–15)
LUM, Local Usage Mark (0 or 1)
EX, Min Class (0 or 1)
ACCOLC, Access Overload Class (0+last digit of the MIN)
LOCK, The User's Lock Code
SS, The System Select (A-Only, B-Only, or Standard A-B/B-A mode)
ICPH, Initial Paging Channel (334 B, 333 A)
HOST and Interaction:
HOST sends CB+DB(X)+LRC to PP
PP sends ACK to HOST
Data Sent To PP:
The NAM data is somewhat standardized, however, each phone manufacturer usually has a built in protocol for doing just this.
RD_NAM
The RD_NAM, or read NAM, function just the opposite of WR_NAM or write NAM. Again, this is typically already setup in a manufacturers phone.
HOST and PP Interaction:
HOST sends CB to PP
PP sends DB(X)+LRC to HOST
WR_SCRATCH_PAD
This "scratch pad" memory is a segment of memory that the system provider can use to store important information in the phone. This information can be credit information, rental information or multi-site drop off information. By having the ability to store a small amount of data in the phone, the system provider can open the doors to many new features. This also provides the system provider with the ability to allow for future updates in the software that can take advantage of this memory. Any size up to 1K, 1024 bytes is adequate.
HOST and PP Interaction:
HOST sends CB+DB(X)+LRC to PP
PP sends an ACK to HOST
RD_SCRATCH_PAD
This is just the opposite of WR_SCRATCH_PAD. With this command, the phone would send the "scratch pad" memory to the HOST.
HOST and PP Interaction:
HOST sends CB to PP
PP sends DB(X)+LRC to HOST
WR_LOCK_DATE
Creates the ability to tell the phone to shut off at some date.
HOST and PP Interaction:
HOST sends CB+DB(3)+LRC to PP
PP sends an ACK to HOST
Data Sent To PP:
The data date format is slightly different in that it contains no time information and does contain year information. The BCD format YYMMDD.
Example:
Jul. 21, 1968 would be 680721
RD_LOCK_DATE
This is just the opposite of WR_LOCK_DATE. This is used to verify or find out what the current lock date is in the phone.
HOST and PP Interaction:
HOST sends CB to PP
PP sends DB(3)+LRC to HOST
Data Sent To Host:
The data DB(3) is a date in the format described in WR_LOCK_DATE.
REGISTRATION
This REGISTRATION command acts as a security feature for the phone manufacturer and the system provider. Before any HOST and PP interaction can occur, the HOST must send this command followed by the password. From that point on, any command issued should work. If this command has not been issued, then the PP should not respond to any HOST commands.
HOST and PP Interaction:
HOST sends CB+DB(16)+LRC to PP
PP sends DB(16)+LRC to HOST
Data sent to PP
The data password may be a default password selected by the system provider.
Data sent to HOST:
The data in then echoed back to the HOST. This helps show the relationship between the system provider and a customer such as a telephone vendor.
WR_CONF_DATA
This is the configuration structure that contains all the necessary parameters for providing a debit service. This data includes items such dialing information, relates and other configuration information, including the complex billing algorithm that permits internal accounting within the phone unit. Once this data is in place and the DO_DEBIT_MODE command is given, the phone will begin using this information to process call charges.
RD_CONF_DATA
This command will read back the configuration data that was written by WR_CONF_DATA.
HOST and PP Interaction:
HOST Sends a CB to PP
PP sends DB(X)+LRC to PP
Data From Phone:
This data (DB(X)) is the size of the data structure discussed in WR_CONF_DATA. This may vary depending on implementation and phone restrictions. Following the data, there should be an LRC.
WR_DOLLAR_AMOUNT
This command is used to update the current dollar limit in the phone. Since this is a single command there stands great risk for fraud. So there is a bit of extra data that helps deter fraud built in.
HOST and PP Interaction:
HOST sends CB+LICENSE NUMBER+LRC to PP
PP sends an ACK to HOST
Data sent to phone:
The HOST will send a CB then a valid license number followed by an LRC. This license number is the same license number that is transmitted "over the air" to the phone or manually imputed via the key pad.
RD_DOLLAR_AMOUNT
This command returns the current dollar amount in the phone.
HOST and PP Interaction:
HOST sends a CB to PP
PP sends DB(2)+LRC to HOST
Data sent to host:
The DB(2) data in the two bytes of dollar data with the Most Significant bit first and Least Significant bit last.
Example:
DB(2)=00 02 which would translate to the value 2.
DO_CALL_TRACKING This command turns on the call tracking feature. If the phone is in call tracking mode, the phone will save, see the RD_PHONE_CALLS command, all calls made so that they may be used to bill the user at a later time.
HOST and PP Interaction:
HOST sends a CB to PP
PP sends an ACK to HOST
    NO_CALL_TRACKING
This command turns on the call tracking feature. This command is useful when the supplier of phones wishes to leave a phone out in the field for long or indefinite periods of time. This command might be used in setting up debit phones at the factory or distribution center so that they would be ready for the retail market.
HOST and PP Interaction:
HOST sends a CB to PP
PP sends an ACK to HOST
    DO_DEBIT_MODE
This command tells the phone to begin the processing and using the WR_CONF_DATA and WR_DOLLAR_AMOUNT's data. When this mode is active, the phone begins to watch each phone call during debiting money's as the phone is in use. Based on the configuration data supplied by WR_CONF_DATA the phone would decrement the WR_DOLLAR_AMOUNT each minute as the phone is in use.
HOST and PP Interaction:
HOST sends a CB to PP
PP sends an ACK to HOST
    NO_DEBIT_MODE
This command tells the phone not to do debit processing. This will most likely be used whenever a customer wants to track calls of a user on a periodic basis as in a rental situation. Again, if call tracking is on and this command is issued, calls are only tracked and the phone should lock when the memory is full.
HOST and PP Interaction:
HOST sends a CB to PP
PP sends an ACK to HOST
    ENABLE_AIR_ACTIVATION
The reasons the commands ENABLE_AIR_ACTIVATION and DISABLE_AIR ACTIVATION is for a customer that doesn't want over the air debit activation for its client users. By turning off the air activation, the customer has less room for fraud. This feature old also be used in creating a value added telephone or different models of the same phone etc..
HOST and PP Interaction:
HOST sends a CB to PP
PP sends an ACK to HOST
    DISABLE_AIR_ACTIVATION
When this command is sent to the phone, the phone will no longer accept debit updates via DTMF tones. The only way a phone could then receive an update is via the keypad or via a self-service transaction station.
HOST and PP Interaction:
HOST sends a CB to PP
PP sends an ACK to HOST When the foregoing command set has been implemented to establish the interface protocol between the HOST, here the central control unit 14, and the PP, here the mobile phone unit 30, the phone unit is programmed to respond to the HOST and to limited user commands as noted. The command set allows for a communication dialogue between the central control unit or its surrogate, and the phone unit.

When the WR_CONF_DATA command is executed, the phone unit is loaded with the necessary data and code, including the complex billing algorithm to enable the phone unit to function as a debit phone upon entering and execution of the DO_DEBIT_MODE command.

The complex billing algorithm factors the multiple variables of a telephone call from a mobile phone into a billing equasion that virtually mirrors the factors considered by public switched network providers and involved wireless service providers, (of which there may be more than one involved in a single call). The resultant call charge accurately approximates the summation of real charges that will be billed by the involved providers enabling an instant calculation of charges. Naturally, any error bias is programmed to favor the accounting system provider to minimize potential under billing. By incorporating a rate table in the phone unit 30, dialogue with the system provider, which may be a separate entity from the wireless service provider, is thereby avoided. Since the rate table used by the complex billing algorithm may change at any time, the mobile phone system of this invention provides for over the air updating of the internal rate table in each phone unit at the initiation of the system provider. Each phone unit may be polled and updated by the system provider during off-hours. Preferably, the updated rate table is coded when the user applies for an increase in the internal phone account. In describing the complex billing algorithm, the acronyms in Table III are used.

TABLE III

| Acronyms | | |
|---|---|---|
| BIT | 1 bit of data | (Used as a flag) |
| BYTE | 8 bits of unsigned type | (Like an unsigned char in C language) |
| INT | 16 bits of unsigned type | (Like an unsigned short int in C language) |
| BYTE[#] | Is a # of Bytes | (Like a storage buffer) |
| DECIMAL | Up to 32 bits | (Like a float in C/ Just a decimal number) |
| RECORD | A collection of the above types | |

The call record configuration structure that enables the billing data to be established for calculation of charges is set forth in TABLE IV.

TABLE IV

RECORD of configuration data {
//This data will tell the phone how to bill calls in any country in the world

| | |
|---|---|
| BYTE | Maximum International Digits |
| BYTE | Minimum International Digits |
| BYTE | Maximum Long Distant Digits |
| BYTE | Minimum Long Distant Digits |
| BYTE | Maximum Local Digits |
| BYTE | Minimum Local Digits |
| BYTE[7] | International Access Code |
| BYTE[7] | Long Distance Access Code |
| BYTE | Is long distance access code always required? |
| BYTE[7] | Third party prefix/Operator/Calling Card Digits |

//Locator Information

| | |
|---|---|
| INT[5] | 5 Home SIDs of the phone (Provides seamless roaming etc . . . ) |
| INT[5] | 5 Home area codes of the phone (Provides computability in congested areas) |

//Rate Information

| | |
|---|---|
| DECIMAL | Base access per minute charge (Applies to all calls) |
| DECIMAL | Additional long distance per minute charges |
| DECIMAL | Additional International per minute charges |
| DECIMAL | Additional roaming per day charges |

TABLE IV-continued

| | |
|---|---|
| DECIMAL | Additional roaming per minute charges |
| DECIMAL | Additional operator assistance charges, calling card or third party billing, or call surcharge for call content |
| //Other Information | |
| BYTE | Base billing delay |
| BYTE[3] | By YYMMDD date, the phone will lock and display "DATE - LOCKED" |
| BYTE[7] | Non billed area code (Expanded to handle 7 digit long distance for third worlds) |
| BYTE[3] | YYMMDD is the last date this phone was roaming on |
| BYTE[5][11] | A block of 5 non billed phone numbers to call (ie . . . 911 and any other user defined) |
| INT[20] | A block of 20 random numbers [1000,9999] if value for license number decoding |
| } | |

The configuration data for the foregoing record fields is explained as follows:

Maximum International Digits—This is the maximum length of a country's country code. For instance, the USA has a country code of 1 while Venezuela has a country code of 58. If these were the only two countries in the world, then the maximum international digits would be 2. This isn't the case and we typically have this set at either 3 or 5 depending on the billing demand.

Minimum International Digits—This is the minimum length of a country code. this will, in almost all cases, be set to 1.

Maximum Long Distance Digits—This is the maximum length of a city's area code. This varies greatly in third world countries. Here in the USA this will always be set at 3 because all area codes are a length of 3. However, some countries area codes range from 1 digit up to 5 or more digits.

Minimum Long Distance Digits—This is just the opposite of the maximum for long distance. Again, for the USA this will always be set to 3 but will vary outside the USA.

Maximum Local Digits—This is the maximum length of digits it takes to call a local number. Here in the USA it is fixed at 7. However, this varies greatly in other countries.

Minimum Local Digits—This is the minimum length of digits it takes to place a local call. This varies greatly even if you are in the USA. This can be used to create different effects in billing. However, because of the scope of the debit phone, this will most likely always be set to 0 or the USA only. (0 would account for an incoming call)

International Access Code—This is the required prefix that must be dialed to place a directly dialed international call. From the USA a customer would dial 011+country code+city/area code+local digits in order to place an international call. This varies greatly from country to country. A length of 7 in the description above provides the system provider with the capability of serving places like the Caribbean. They require a standard 7 digit number as a prefix to. (This is just an example of place in the Caribbean)

Long Distance Access Code—This is the digit or digits that are required for a user to dial in order to place a long distance call. From the USA, the user would dial a 1+, sometimes called one plus dialing. In other countries, this varies from a simple 0 to some lengthy digits eg.. 108 for the Philippines.

Is Long Distance Access Code Required—In some cellular systems, it is not required that you dial the long distance access code in order to place a long distance call. In San Francisco, for example, if one were to call Utah information, all one would have to do is dial 801-555-1212, 1-801-555-1212 would also get to the same place. If the long distance access code is required, it will help the accuracy of the billing algorithm.

Third Party Prefix/Operator/Calling Card—this essentially is the digits that must be dialed to reach the operator. In the USA, 0 is the digit necessary to reach the operator. It also is the digit necessary to place a collect call or credit card call.

Billing Delay—After X seconds have passed, billing will begin. Since the phone does not know exactly when the call has been connected, we have to approximate this connection. If the call lasts under this X seconds, then the user is not billed for the call. However, if the call lasts X seconds, then the user is billed from the time they hit SND to END or the call is dropped.

Home SID—This is the cellular system ID this phone is assigned to.

Home Area Code—This is the area code of the cellular phone number or MIN, Mobile Identification Number.

Base Access Per Minute Charge—This rate is added to every telephone call made. This is the base rate for the telephone call. The only way this rate would not be added in is if the Billing Delay had not been reached.

Additional Per Minute Long Distance Charge—This rate is added upon the Base Access rate when the call placed is classified as a long distance call.

Additional International Per Minute Charge—This rate is added upon the Base Access rate when the call placed is classified as an international call.

Additional Roaming Per Day Charge—This rate is added upon the Base Access rate when the call is a roaming call and this charge has not been already been applied today.

Additional Roaming Per Minute Charge—This rate is added upon the Base Access rate and possible the Additional Roaming Per Day Charge when the call is a roaming call.

Additional Operator Assistance Charge—This rate is added upon the Base Access rate when the call starts with the Third Party Prefix/Operator digit(s) or is a surcharge for call connects identified as data transfer calls or the like.

Lock Date—This is the date the phone will no longer function on. The phone will display "DATE—LOCKED" and will not be able to be used until it is reprogrammed via the HOST or a license number.

Non-Billed Area code—This is an area code or number that is to be billed. This would be set to 800 for the USA. (NOTE: Only the long distance part of the charge is not billed)

Last Date Phone Was Roaming—This is used to store the last date the customer was charged Roaming Per Day. If a call is roaming and today isn't equal to the Last Date Phone Was Roaming, then the Roaming Per Day Charge would apply.

Non-Billed Numbers—This is a block of at least 5 numbers of 11 digits in length that provides the flexibility not to bill for certain phone numbers called. Numbers like 911 or other special numbers such as *18 for roaming. Any Non-Billed Number can also be dialed even if the phone is out of money or locked. This way, if the user's phone runs out of money in debit mode, the user can use that very phone to call a Non-Billed Number, such as customer support, to increase their credit on the phone.

Random Number Block—This is a block of numbers ranging from 1000–9999 that are used in decoding license numbers.

The basic complex billing algorithm calculates the call charges for the basic categories of local calls, longs distance calls, international calls and roaming calls. As the algorithm allows compounding of categories, the call types are a complex of factors, for example, incoming roaming long distance call. The algorithm is easily expanded to handle other categories, for example data transfer calls, for which deductions or surcharges may apply. In classifying a call, the following factors are considered which covers virtually all situations:

Local Call—If the call digit length is less than or equal to the Maximum Local Digits and the call digit length is greater than or equal to the Minimum Local digits, then this is a local call.

Long Distance Call—First, long distance calls are the most cumbersome to classify because there are so many possibilities. However, this can be boiled down to a few tests.

If the number starts with the Long Distance Access Code, then subtract the length of the Long Distance Access Code from the length of the call digits. (ie.. If I dial 1-510-838-2400 the length is 11−1=10)

If the NEWLY calculated call digit length is less than or equal to (the Maximum Local Digits+the Maximum Long Distance Digits) and the call digit length is greater than or equal to (the Minimum Local Digits+the Minimum Long Distance Digits) then:

If the call does not start with the Long Distance Access Code and the Long Distance Access Code Required flag is set to yes, then this call is not a legitimate long distance call. (This is helpful in third worlds)

The following special cases are considered:

Is a Call Roaming?

If the SID the phone is currently in when the call is placed is not equal to any of the 5 Home SIDs, then the call is roaming.

Third Party Prefix/Operator Assisted Calls

If any call begins with the Third Party Prefix, then the call is not to be billed at all.

Billing Delay

If a call lasts under the Billing Delay seconds, then the call is not to be billed at all.

Date Locking

If the current date is equal or greater than the current Lock Date, the phone should lock and display "DATE—LOCKED"

The following examples provide an overview on the manner calls are calculated:

---

M = Number of minutes the call lasted
L = Local Call Per Minute Charge
LD = Long Distance Per Minute Charge
IT = International Per Minute Charge
RD = Roaming Per Day Charge
RM = Roaming Per Minute Charge
Local = M * L
Long Distance = M * (L + LD)
International = M * (L + IT)
Incoming Call = M * L
Local Roaming Call = M * (L + RM) + RD (If RD has not been applied today)
Long Distance Roaming = M * (L + RM + LD) + RD (If RD has not been applied today)
International Roaming = M * (L + RM + IT) + RD (If RD has not been applied today)

---

Once a call has been classified, as close to pressing SND as possible, the charges described above need to be tracked on a minute by minute basis. One reason might be that if a user gets a dropped call or some unexpected end of a call, the system provider wants to be able to bill the call as close to it can to the number of minutes the user actually talked. The phone updates the debit amount every minute on the minute during a call. So, for a local call, the minute by minute calculation might be as follows:

$$\text{Total Charge} = \text{Total Charge} + L$$

The user should be notified by a tone or set of tones in the earpiece and on the phone's screen or by the warning lights if there is less than 5 minutes of air time left at the current rate of use.

The mobile phone system of this invention allows over the air activation and dialogue with the phone unit 30 using DTMF signals and the paging capability of a mobile phone with a receiver decoder. The current allowable dollar amount in the internal account of the phone unit can then be upgraded over the air. During the DTMF dialogue between the central processing unit of the system provider and the user's phone, the encrypted license number of the user's phone is transferred and verified. The user's account is checked to determine if upgrade is warranted or is flagged as a credit risk. The upgrade amount is encrypted and keyed to the encrypted license number and transferred to the user together with any update of the rate schedule.

When the user exhausts the amount in the internal account in the phone unit 30, the phone unit is locked, and the display 33 shows "EMPTY-LOCKED." The phone unit 30 is placed in paging mode enabling customer service to be paged for an account upgrade.

Similarly, when the use period expires, the phone unit 30 becomes locked and the display 33 shows "DATE-LOCKED," and is placed in paging mode. Where the user has a low account balance, he voluntarily enters page mode and contacts customer service for an account increase.

If desired, the phone unit when in involuntary paging mode can have restricted paging function, allowing only contact to the service center and receipt of a license number. This disables the phone, even as a pager and deters theft in the rental environment. Alternately, the phone unit when locked can retain full paging capabilities.

It is to be understood that all of the data security issues are not here addressed and the security measures to be implemented depends on the environment of use, and the position of the system provider in the service network. Upgrades are phone specific and are verified internally in the phone using parameters unique to the phone unit. The license numbers after verification, are not stored or known to the user except in encrypted form.

The mobile phone system of this invention provides substantial flexibility by the features described. Phone retailers can sell and activate phones on site without special equipment. Furthermore, phones with internal accounting allow for prepayment of service and call usage charges permitting the retailer to make credit judgment or cash sales independent of the service provider. Additionally, the task of the system provider can be assumed by the retailer, the service provider or an independent entity that assumes the risk or provides for only cash prepayment transactions.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A mobile phone system comprising a system provider having a host processor unit and a plurality of system users each having at least one mobile phone unit wherein:

the host processor unit has communication means for selectively establishing a communication link with each mobile phone unit; and, each phone unit includes a processor, a clock chip, memory associated with the processor, program means including a complex billing algorithm and rate data for internally calculating call charges as calls are made, wherein the phone unit includes internal accounting means for generating a debit account with an account amount in the phone unit and decrementing the account amount in the debit account in real time, and wherein the system provider has payment verification means under system provider control for setting a phone use account amount and communicating the account amount to the phone unit, wherein the internal accounting means adds the account amount to the debit account.

2. The mobile phone system of claim 1 wherein the program means further includes means for storing call charges as record data in the memory.

3. The mobile phone system of claim 2 wherein the communication means of the host processor unit has program means for initiating the communication link at a time controlled by the system provider and activating the communication of the record data of stored call charges from the mobile phone unit to the system provider.

4. The mobile phone system of claim 1 wherein the host processor unit includes program means for increasing the amount of the debit account in the mobile phone unit during a communication link with the phone unit.

5. The mobile phone system of claim 4 wherein the mobile phone unit has an RF transceiver and the communication link is established over the airways by RF signals.

6. The mobile phone system of claim 1 wherein the mobile phone unit has control means for deactivating the mobile phone unit when the debit account is exhausted.

7. The mobile phone system of claim 6 wherein the mobile phone unit has paging means for establishing a communication link with the host processor unit when deactivated.

8. The mobile phone system of claim 1 wherein the phone system includes a transaction station wherein the phone unit has means for establishing a communication link with the transaction station and upon verification of a set payment account amount increasing the amount of the debit account in the phone unit.

9. The mobile phone system of claim 1 wherein the payment verification means for setting a phone use account amount and communicating the account amount to the mobile phone unit has security means for securely communicating the account amount to the mobile phone unit.

10. The mobile phone system of claim 9 wherein the security means of the payment verification means includes encryption means for encrypting account communications with the mobile phone unit.

11. The mobile phone system of claim 5 wherein the RF signals include security means for securely communicating the set account amount to the mobile phone unit.

12. The mobile phone system of claim 3 wherein the communication means for the host processor unit includes security means for securely activating and communicating the record data or stored call charges from the mobile phone unit to the system provider.

13. The mobile phone system of claim 3 wherein the program means for initiating the communication link at a time controlled by the system provider has means for initiating a periodic polling of the mobile phone unit during off-peak hours.

14. The mobile phone system of claim 1 wherein the payment verification means under system provider control includes a transaction station wherein the transaction station has means for communicating with a system user and the user's mobile phone unit and verifying the authenticity of a transaction setting an account amount added to the debit account of a mobile phone unit.

15. The mobile phone system of claim 14 wherein the transaction station includes prepayment means for prepayment of a set account amount for adding to the internal debit account of the mobile phone unit.

16. The mobile phone system of claim 14 wherein the transaction station includes security means for secure communications between the transaction station and the mobile phone unit.

17. The mobile phone system of claim 16 wherein the security means includes direct electronic coupling of the mobile phone unit with the transaction station.

18. The mobile phone system of claim 1 wherein the mobile phone unit has communication means for communicating in a communication network through a wireless service provider.

19. The mobile phone system of claim 18 wherein the wireless service provider and the system provider comprise a single entity.

20. The mobile phone system of claim 18 wherein the wireless service provider and the system provider comprise different entities.

21. The mobile phone system of claim 1 wherein the mobile phone unit includes a visual display and the program means generates a visual display of current debit account status in the visual display.

22. The mobile phone system of claim 1 wherein the mobile phone unit is a hand-held device with the complex billing algorithm and rate data retained in the memory of the hand-held device.

23. The mobile phone-system of claim 1 wherein the rate data comprises a rate table under control of the system provider and secure from the mobile phone unit user.

24. The mobile phone system of claim 1 wherein the complex billing algorithm includes a multiple factor accounting protocol.

25. The mobile phone system of claim 24 wherein the multiple factor accounting protocol includes code means for factoring in call charges based on the location of the phone unit in a multi-zone communication network.

26. The mobile phone system of claim 24 wherein the multiple factor accounting protocol include code means for factoring in call charges based on the location of the mobile phone unit when called.

27. The mobile phone system of claim 24 wherein the multiple factor accounting protocol includes code means for factoring in call charges based on a location of a party being called.

28. The mobile phone system of claim 24 wherein the multiple factor accounting protocol includes code means for factoring in call surcharges and deductions based on a data content of a call.

29. The mobile phone system of claim 24 wherein the multiple factor accounting protocol includes code means for classifying calls for calculating call charges based on a telephone number called from the mobile phone unit.

30. The mobile phone system of claim 1 wherein the communication means of the host processor unit has means under control of the system provider secure from the mobile phone unit user for periodically updating the rate data in the mobile phone unit.

31. The mobile phone system of claim 24 wherein the clock chip of the mobile phone unit is a real time clock chip and the multiple factor accounting protocol includes code means for calculating call charges based on the time of day of calls on the mobile phone unit.

32. The mobile phone system of claim 31 wherein the phone unit has circuit means for deactivating the phone unit at a predetermined time and date.

33. The mobile phone system of claim 1 wherein the processor system includes multiple host processor units and a central processor unit with means for communicating with the host processor units.

* * * * *

US 5,577,100 C1

(12) EX PARTE REEXAMINATION CERTIFICATE (9399th)
United States Patent
McGregor et al.

(10) Number: US 5,577,100 C1
(45) Certificate Issued: Nov. 6, 2012

(54) MOBILE PHONE WITH INTERNAL ACCOUNTING

(75) Inventors: Donald S. McGregor, Danville, CA (US); Gregory M. McGregor, Danville, CA (US)

(73) Assignee: Telemac Corporation, Los Angeles, CA (US)

Reexamination Request:
No. 90/008,064, Oct. 23, 2006

Reexamination Certificate for:
Patent No.: 5,577,100
Issued: Nov. 19, 1996
Appl. No.: 08/381,704
Filed: Jan. 30, 1995

(51) Int. Cl.
*H04Q 7/38* (2006.01)
*H04Q 7/32* (2006.01)
*H04M 15/30* (2006.01)
*H04M 15/00* (2006.01)
*H04M 15/28* (2006.01)

(52) U.S. Cl. ......................................... 455/406; 455/418
(58) Field of Classification Search ........................ None
See application file for complete search history.

(56) References Cited

To view the complete listing of prior art documents cited during the proceeding for Reexamination Control Number 90/008,064, please refer to the USPTO's public Patent Application Information Retrieval (PAIR) system under the Display References tab.

*Primary Examiner* — Scott L. Weaver

(57) ABSTRACT

A mobile phone system with a mobile phone having internal accounting capabilities for real time call debiting to account for the billing parameters of a mobile phone unit that is operated in a multi zone communication network with a complex rate structure, the mobile phone unit having an internal processor with accessible internal memory for storing the accounting program and call data for each call, a clock and circuit means for activating and deactivating the phone, the accounting program including an updatable rate table and a complex billing algorithm for calculating the account status on the fly including multiple rate structure factors such as long distance calls, international calls with country independent local charges, charges for roaming per day and/or roaming per minute, and call surcharges, where the account status of the mobile phone is calculated in real time for decrementing a debit account or calculating an account charge on demand, the mobile debit phone having a signal for alerting the user of account status which is preferably a display of real time account status, the mobile phone system including a communication system for activating and programming a new phone unit over the airways and upgrading the account status in rate table in the phone unit over the airways.

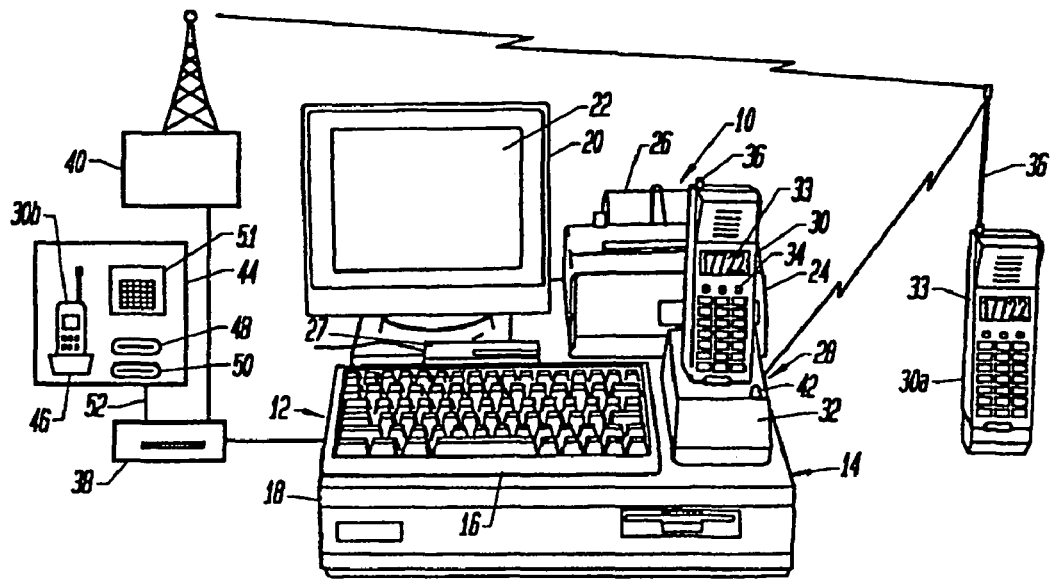

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-24, 26-27 and 29-33 are cancelled.

Claims 25 and 28 are determined to be patentable as amended.

25. [The mobile phone system of claim 24] *A mobile phone system comprising a system provider having a host processor unit and a plurality of system users each having at least one mobile phone unit wherein:*
   *the host processor unit has communication means for selectively establishing a communication link with each mobile phone unit; and,*
   *each phone unit includes a processor, a clock chip, memory associated with the processor, mobile phone unit identification information, program means including a complex billing algorithm and rate data for internally calculating call charges as calls are made, wherein the phone unit includes internal accounting means for generating a debit account with an prepaid account amount in the phone unit and decrementing the account amount in the debit account in real time, and wherein the system provider host processor has payment verification means under system provider control for ascertaining a mobile phone unit's identification information and determining if an account amount should be set and, if so, the host processor sets a phone use account amount and communicates the account amount to the phone unit, by transmitting codes customized to that particular phone unit wherein the internal accounting means adds the account amount to the debit account,*
   *wherein the complex billing algorithm includes a multiple factor accounting protocol and* wherein the multiple factor accounting protocol includes code means for factoring in call charges based on [the] *a* location of the phone unit in a multi-zone communication network.

28. [The mobile phone system of claim 24] *A mobile phone system comprising a system provider having a host processor unit and a plurality of system users each having at least one mobile phone unit wherein:*
   *the host processor unit has communication means for selectively establishing a communication link with each mobile phone unit; and,*
   *each phone unit includes a processor, a clock chip, memory associated with the processor, mobile phone unit identification information, program means including a complex billing algorithm and rate data for internally calculating call charges as calls are made, wherein the phone unit includes internal accounting means for generating a debit account with an prepaid account amount in the phone unit and decrementing the account amount in the debit account in real time, and wherein the system provider host processor has payment verification means under system provider control for ascertaining a mobile phone unit's identification information and determining if an account amount should be set and, if so, the host processor sets a phone use account amount and communicates the account amount to the phone unit, by transmitting codes customized to that particular phone unit wherein the internal accounting means adds the account amount to the debit account,*
   *wherein the complex billing algorithm includes a multiple factor accounting protocol and* wherein the multiple factor accounting protocol includes code means for factoring in call surcharges and deductions based on a data content of a call.

* * * * *